(12) United States Patent
Delco

(10) Patent No.: US 8,825,909 B1
(45) Date of Patent: Sep. 2, 2014

(54) APPLICATION DIRECTED DYNAMIC DRIVER SUBSTITUTION

(75) Inventor: Matthew Ray Delco, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 668 days.

(21) Appl. No.: 13/036,268

(22) Filed: Feb. 28, 2011

(51) Int. Cl.
*G06F 3/00* (2006.01)

(52) U.S. Cl.
USPC ............................... 710/8; 710/10

(58) Field of Classification Search
None
See application file for complete search history.

(56) References Cited

U.S. PATENT DOCUMENTS

| 7,082,598 | B1 | 7/2006 | Le |
| 7,839,523 | B2 * | 11/2010 | Tredoux et al. ............ 358/1.15 |
| 2004/0034862 | A1 * | 2/2004 | Kadota ...................... 719/321 |
| 2006/0168372 | A1 * | 7/2006 | Smith et al. .................. 710/62 |

OTHER PUBLICATIONS

Selected pages from Windows 7 WDK (Windows Driver Kit), updated Dec. 11, 2009 (download available from http://msdn.microsoft.com/en-us/windows/hardware/gg487458.aspx).

* cited by examiner

*Primary Examiner* — Kris Rhu

(57) ABSTRACT

An application directed method for substituting a driver for a target device includes the steps of updating a set of hardware identifiers for the target device to include a new hardware device, building a list of drivers based on the set of hardware identifiers that includes the new hardware identifier, and calling into an operating system to cause the operating system to switch the driver for the target device to a new driver which is selected from the list. With this method, a device that has multiple drivers associated therewith can have just one of the drivers substituted, and where multiple devices share the same hardware ID, the driver for just one of the devices can be substituted.

20 Claims, 6 Drawing Sheets

```
static void
MoveUsbDevice(WCHAR *deviceInstanceID, WCHAR *newDriverHardwareID)
{
  HDEVINFO devList;
  DWORD index = 0;
  SP_DEVINFO_DATA devInfo = {sizeof (SP_DEVINFO_DATA)};
  SP_DRVINFO_DATA driverInfoData = {sizeof (SP_DRVINFO_DATA)};
  DWORD reboot = FALSE;

devList = SetupDiGetClassDevs(NULL, deviceInstanceID, NULL,
                   DIGCF_ALLCLASSES | DIGCF_DEVICEINTERFACE | DIGCF_PRESENT);

SetupDiOpenDeviceInfo(devList, deviceInstanceID, NULL, 0, &devInfo);

CM_Add_ID(devInfo.DevInst, newDriverHardwareID, CM_ADD_ID_COMPATIBLE);  ← Step 314

SetupDiBuildDriverInfoList(devList, &devInfo, SPDIT_COMPATDRIVER);
  SetupDiBuildDriverInfoList(devList, &devInfo, SPDIT_CLASSDRIVER);

while (SetupDiEnumDriverInfo(devList, &devInfo, SPDIT_COMPATDRIVER,
                   index++, &driverInfoData)) {
    char buffer[2048 + MAX_PATH * 8];
    SP_DRVINFO_DETAIL_DATA *driverInfoDataDetail = (SP_DRVINFO_DETAIL_DATA *)buffer;
    DWORD driverInfoDataDetailLen;

driverInfoDataDetail->cbSize = sizeof *driverInfoDataDetail;
    driverInfoDataDetailLen = sizeof buffer;

SetupDiGetDriverInfoDetail(devList, &devInfo, &driverInfoData,
                   driverInfoDataDetail, driverInfoDataDetailLen,
                   &driverInfoDataDetailLen);

if (wcsicmp(driverInfoDataDetail->HardwareID, newDriverHardwareID) == 0) {
      SetupDiSetSelectedDriver(devList, &devInfo, &driverInfoData);
      break;
    }
  }

SetupDiSetSelectedDevice(devList, &devInfo);
  InstallSelectedDriver(NULL, devList, 0, FALSE, &reboot);

SetupDiDestroyDriverInfoList(devList, &devInfo, SPDIT_CLASSDRIVER);
  SetupDiDestroyDriverInfoList(devList, &devInfo, SPDIT_COMPATDRIVER);

SetupDiDestroyDeviceInfoList(devList);
}
```

Step 316
Step 318
Step 320

FIGURE 4

APPLICATION DIRECTED DYNAMIC DRIVER SUBSTITUTION

BACKGROUND

An operating system (OS) is a collection of programs that provide an interface to and a set of abstractions of system resources to higher-level programs called applications. The OS enables the applications to access a computer's hardware, such as its processor, memory, and disks, in a uniform and controlled manner. The OS includes programs called "drivers" that control access by the applications to certain computer hardware components, called devices, which can be added to and removed from the computer. A driver understands the low-level hardware details of a specific device (or a group of similar devices) so that it can communicate with the device(s).

A given device can have one or more hardware IDs. Many are based on a vendor ID and a product ID, and some are based instead or additionally on other IDs such as the class ID or the revision ID. When a device is added to a computer, the OS queries the properties of the device to assemble a list of hardware and compatible IDs for the device and the instance ID of the device and consults a local database, such as the registry in Microsoft Windows® OS, to check whether the device has been detected before and whether a driver was previously mapped to that particular device. If no mapping exists for the device, the OS uses the list of hardware and compatible IDs for the device to try to locate and select a driver to use for the device. Multiple drivers may be available, so a ranking scheme is used to pick the best driver. This process for selecting the best driver is carried out by searching through information files of drivers, commonly known as INF files, to find drivers that support the hardware and compatible IDs for the device and then selecting the driver based on a combination of factors: (1) the version and release date of the driver; (2) whether the driver has been certified; and (3) how closely the hardware ID supported by the driver matches the hardware ID(s) of the device. However, if no driver is available, the OS asks the user to insert a CD or floppy disk containing the driver. Newer versions of the OS will also use the Internet to check for additional drivers before the user is prompted.

The user may also select a particular driver for a device through an OS interface that displays a ranked list of compatible drivers. In preparing the interface, the OS enumerates hardware and compatible IDs of the device and searches through information files of drivers to find drivers that support the enumerated hardware and compatible IDs. After the list of drivers has been assembled, the OS ranks the drivers based on a variety of factors including: (1) the version and release date of the driver; (2) whether the driver has been certified; and (3) how closely the hardware ID supported by the driver matches hardware ID of the device. It should be recognized that the OS limits the selection of a driver for a particular device, whether the selection is performed automatically by the OS or by the user from a list generated by the OS, to ones that claim to support the device, so as to prevent crashes or other types of issues from occurring.

In some situations, it may be desirable to substitute a different driver for a device for which an existing driver has already been loaded by the OS. An application may want this feature to access the device in new ways not previously permitted by the existing driver. The application can also gain exclusive access to the device if the new driver exports a set of program calls known only to that application. This would prevent other applications from even knowing that the device exists.

One example application for which driver substitution is useful is a virtual machine monitor (VMM), which provides a supporting interface for a virtual machine (VM), in situations where the VM wants exclusive access to a physical USB device. To support the VM's access to the physical USB device, a special USB driver called a "generic" or "pass-through" driver needs to be loaded for the VMM. Unfortunately, even before the VMM began running, the OS may have loaded a different driver for the physical USB device, and the VMM will not be able to communicate with the physical USB device and support the VM's access to the physical USB device.

U.S. Pat. No. 7,082,598 (the '598 patent), the entire contents of which are incorporated by reference herein, teaches a driver substitution method that can be used to dynamically replace the driver for a particular device with a different driver. In this method, a special process running in the kernel simulates an unplug event for the device followed by a plug-in event. The unplug event invalidates the driver that the OS has loaded and the plug-in event causes the OS to go through the process of loading a new driver for the device. During the process of loading the new driver, the special process running in the kernel intercepts messages that query the device properties that are used by the OS to generate the hardware and instance IDs of the device and modifies the device properties so that the OS is fooled into loading the driver designated by the special process. One limitation of this method is that the special process is configured to intercept messages only from primary devices. As a result, if a primary device has two or more secondary devices, such as in the case of a USB composite device (e.g., a web camera incorporating both video and audio capture devices), the driver substitution cannot be done on an independent basis for each of the secondary devices.

The '598 patent suggests another possible technique for performing driver substitution. This alternative method employs APIs provided by the OS, such as the Microsoft Windows® API function UpdateDriverForPlugAndPlayDevices( ), to change the driver that is mapped to a specific hardware ID in the registry. The shortcoming of this technique, as recognized in the '598 patent, is that the drivers for all devices with the affected hardware ID are changed. For example, if there are three identical USB cameras, C1, C2, and C3, and the VMM wishes to connect only C1 to a virtual computer and replace the C1 camera driver with a generic USB driver, changing the driver for the C1 camera would also change the drivers for the C2 and C3 cameras because they share the same hardware ID.

SUMMARY

One or more embodiments of the present invention provide methods carried out at the application level for dynamically substituting device driver that overcomes the drawbacks of the methods described above. Because the methods are carried out at the application level, they are inherently simpler than the methods carried out at the kernel level. In addition, with these methods, a device that has multiple drivers associated therewith can have just one of the drivers substituted, and where multiple devices share the same hardware ID, the driver for just one of the devices can be substituted.

A method of substituting a driver for a target device according to an embodiment of the present invention includes the steps of updating a set of hardware identifiers for the target device to include a new hardware identifier, building a list of drivers based on the set of hardware identifiers that includes the new hardware identifier, and calling into the operating system to cause the operating system to switch the driver for the target device to a new driver which is selected from the list A method of substituting one of at least two drivers for a target device according to an embodiment of the present invention includes the steps of updating a set of hardware identifiers for a sub-component of the target device to include a new hardware identifier, building a list of drivers based on the set of hardware identifiers that includes the new hardware identifier, and selecting, as the new driver to replace one of at least two drivers for the target device, a driver from the list having a property that matches the new hardware identifier.

Further embodiments of the present invention include, without limitation, a non-transitory computer-readable storage medium that includes instructions that enable a processing unit to implement one or more aspects of the above methods as well as a computer system configured to implement one or more aspects of the above methods.

BRIEF DESCRIPTION OF THE DRAWINGS

FIG. 4 is sample code for carrying out part of the method of FIG. 3.

DETAILED DESCRIPTION

Figure 1:
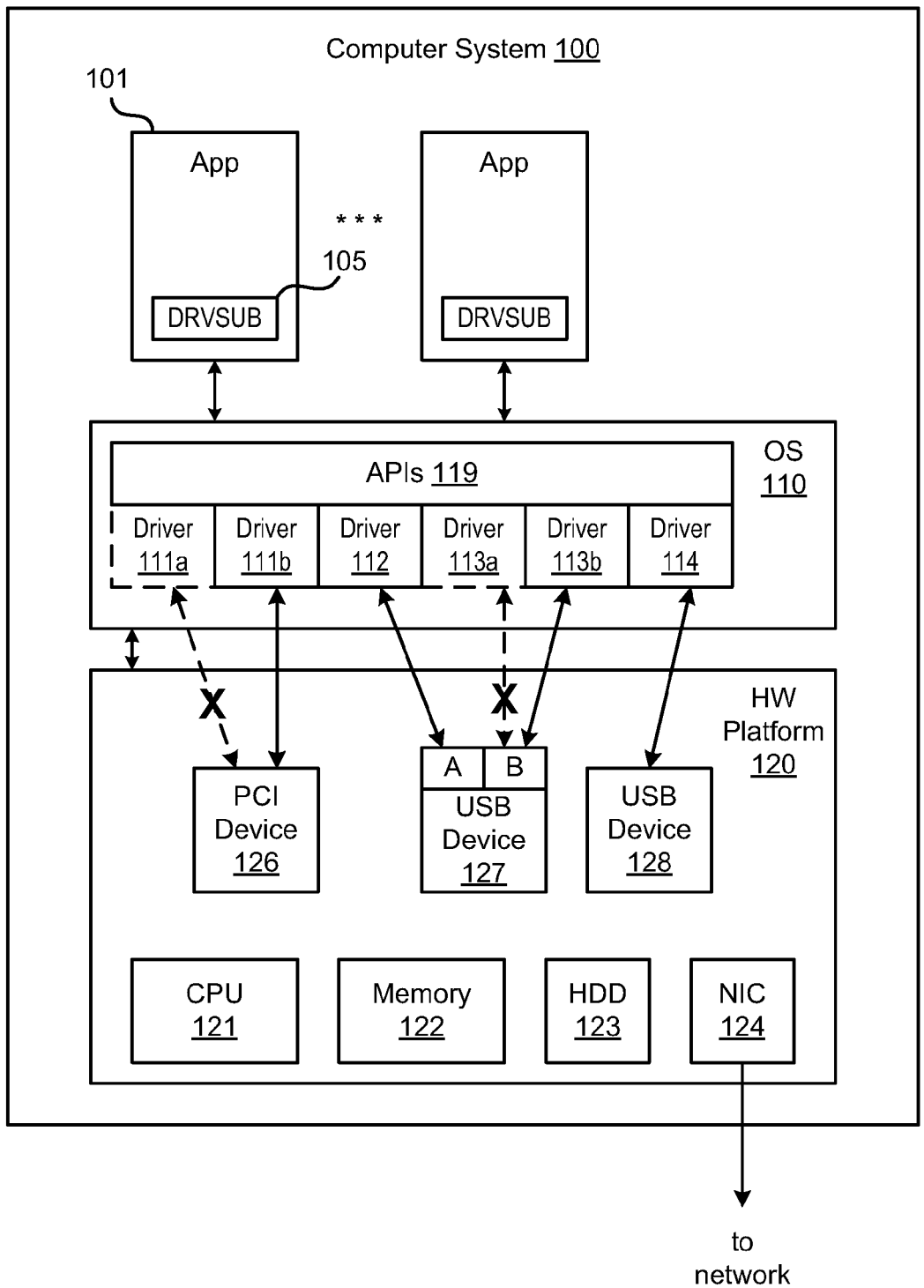
FIG. 1 depicts a block diagram of a computer system in which one or more embodiments of the present invention may be practiced.

FIG. 1 depicts a block diagram of a computer system in which one or more embodiments of the present invention may be practiced. Computer system 100 includes multiple applications, including application (App) 101, that are running on top of operating system (OS) 110. In one embodiment, OS 110 is a version of Microsoft Windows®, although the technology described below may be implemented for other operating systems. OS 110 includes a plurality of software layers including a kernel (not shown) that manages hardware resources provided by hardware platform 120 through various drivers. The drivers illustrated in FIG. 1 include drivers 111a, 111b for a PCI device 126 and drivers 112, 113a, 113b for a USB device 127 that has multiple functionalities, known as a USB composite device, such as a web camera which has both video and audio functionalities, and driver 114 for a USB device 128. Another example of a USB composite device is a keyboard that has a thumbprint reader on it. It should be recognized that the drivers shown in FIG. 1 are for illustrative purposes and actual computer systems can include more or less and drivers for different types of devices, such as SCSI devices. OS 110 exposes a set of application program interfaces (APIs) 119 to the applications, which allows the applications to use the devices. APIs 119 further include a class of APIs that are used to manage devices and the installation of drivers. Documentation for these APIs is provided in Windows® 7 WDK (Windows® Driver Kit), updated Dec. 11, 2009, the entire contents of which are incorporated by reference herein. Hardware platform 120 includes one or more central processing units ("CPU") 121, system memory 122, a hard disk drive ("HDD") 123, a network interface ("NIC") 124 that connects computer system 100 to a network, PCI device 126, and USB devices 127, 128.

When OS 110 boots up, it queries all of the devices of computer system 100 for their hardware and compatible IDs and instance IDs. An instance ID of a particular device includes the device's hardware ID and additional data, such as location data, to distinguish the device from other devices that have the same hardware ID. For composite USB devices having sub-components, e.g., USB device 127 with sub-components USB device 127A and USB device 127B, a unique instance ID is given to each of the sub-components. Further, the sub-components are represented by OS 110 as separate discrete devices. Then, OS 110 consults its registry to find drivers for the devices using the instance IDs of the devices. When the registry does not contain a mapping to a driver for a particular device, OS 110 executes a process to find the most appropriate driver for the device. In some situations, the user may want to substitute a different driver for a device for which an existing driver has already been loaded and with a driver that OS 110 does not recognize as a valid driver for the device. In FIG. 1, this substitution is carried out by executing an application-level code, DRVSUB 105, the details of which will be described below. The illustration in FIG. 1 shows some example results of executing DRVSUB 105. A driver for PCI device 126 is changed from driver 111a to driver 111b, and a driver for function B of composite USB device 127 is changed from driver 113a to driver 113b. The driver for function A of composite USB device 127 is not changed and the driver for non-composite USB device 128 is not changed.

Figure 2:
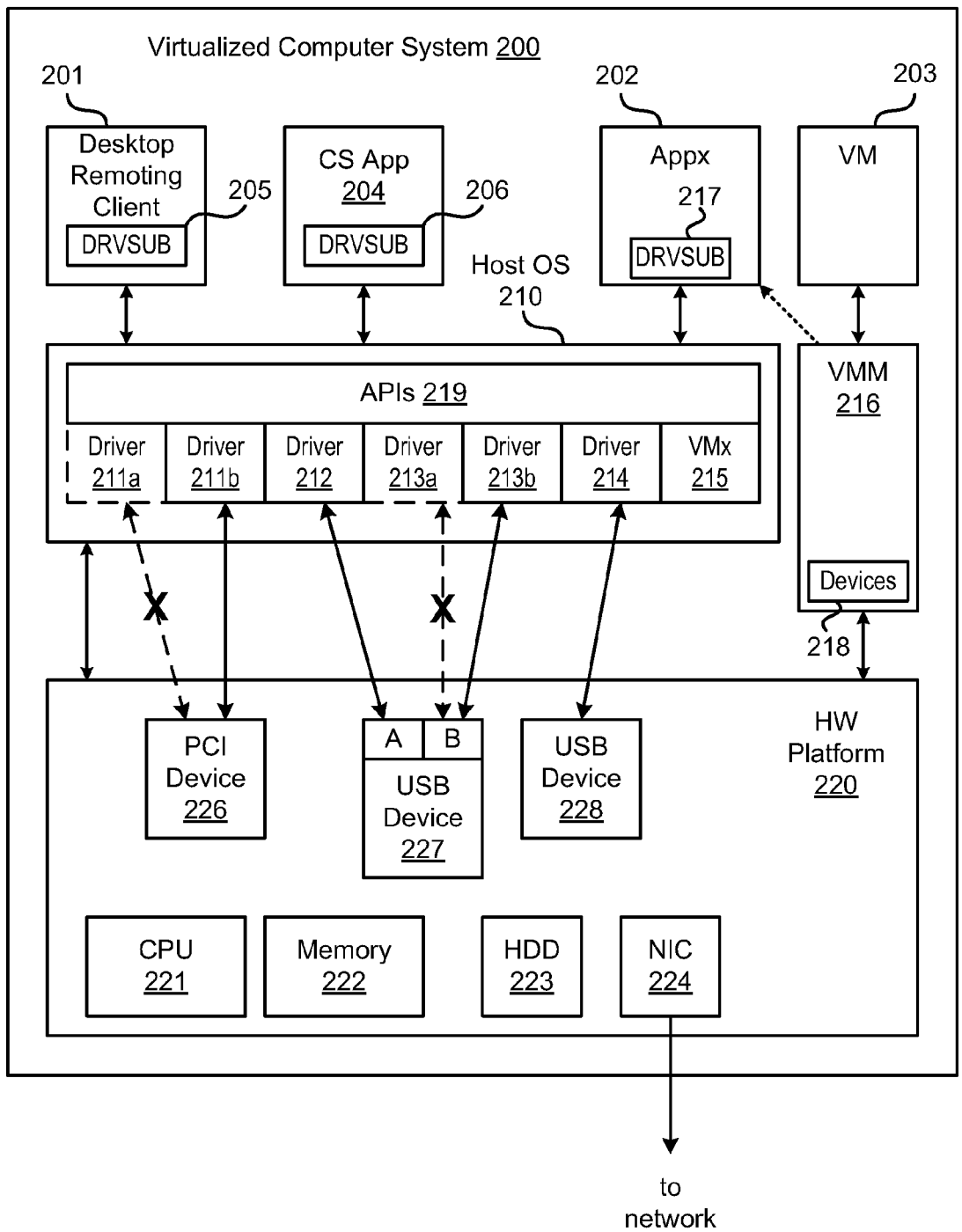
FIG. 2 depicts a block diagram of a virtualized computer system in which one or more embodiments of the present invention may be practiced.

FIG. 2 depicts a block diagram of a virtualized computer system in which one or more embodiments of the present invention may be practiced. Virtualized computer system 200 is of the "hosted" type because it includes a host OS 210 that manages hardware resources provided by hardware platform 220 through various drivers. The drivers illustrated in FIG. 2 include drivers 211a, 211b for a PCI device 226, drivers 212, 213a, 213b for a composite USB device 227, and driver 214 for a non-composite USB device 228. OS 210 exposes a set of APIs 219 to the applications, which allows the applications to use the devices. APIs 219 further include a class of APIs that are used to manage devices and the installation of drivers, as discussed above for APIs 119. Hardware platform 220 includes one or more central processing units (CPU) 221, system memory 222, a hard disk drive (HDD) 223, a network interface card (NIC) 224 that connects computer system 200 to a network, PCI device 226, and USB devices 227, 228.

In the embodiment illustrated in FIG. 2, applications running on top of host OS 210 include desktop remoting client 201 and Appx 202 that supports running of virtual machine (VM) 203 on top of virtual machine monitor (VMM) 216. VM 203 is an abstraction of a physical computer system having virtual hardware resources. The virtual hardware resources are emulated by VMM 216 and include virtual devices 218. A guest operating system (not shown) provides guest applications (not shown) running in VM 203 access to virtual devices 218 in a manner analogous to APIs 219 and Drivers 211-215 of host OS 210. Virtual devices 218 may include abstractions of CPU 221, memory 222, HDD 223, NIC 224, and devices 226, 227, 227A, 227B, 228, or a subset thereof. When VMM 216 needs host OS 210 to process an input/output request, it calls into Appx 202, which in turn calls a special driver, VMx 215, provided in host OS 210.

VMx 215 thus forms a kind of "gateway" into host OS 210, through which VMM 216 can enter via Appx 202. Host OS 210 remains unaware of, and need not be modified to accommodate, the VM/VMM sub-system. It should be recognized that other VMs, each with its respective VMM and Appx, may be run in virtualized computer system 200 concurrently with desktop remoting client 201 and VM 203. Desktop remoting client 201 is an application that permits a user to access remote desktops, e.g., VMs, running in a remote data center. Desktop remoting client 201 may be, e.g., VMware® View™.

In the embodiment of FIG. 2, when a driver substitution is desired for a device for which an existing driver has already been loaded, DRVSUB 205 is executed from within desktop remoting client 201, or DRVSUB 217 from within Appx 202 responsive to a call from VMM 216 of VM 203. The illustration in FIG. 2 shows some example results of executing DRVSUB 205 or DRVSUB 217. A driver for PCI device 226 is changed from driver 211a to driver 211b, and a driver for function B of composite USB device 227 is changed from driver 213a to driver 213b. The driver for function A of composite USB device 227 is not changed and the driver for non-composite USB device 228 is not changed. In alternative embodiments, DRVSUB 206 is executed from within a centralized service application (CS App) 204 that either desktop remoting client 201 or Appx 202 can contact to request access to the device. This centralized service application 204 can perform the driver switch and then open the driver and pass the reference to the requesting application, or provide the identifying information that the requesting application can use to open the driver directly.

Figure 3:
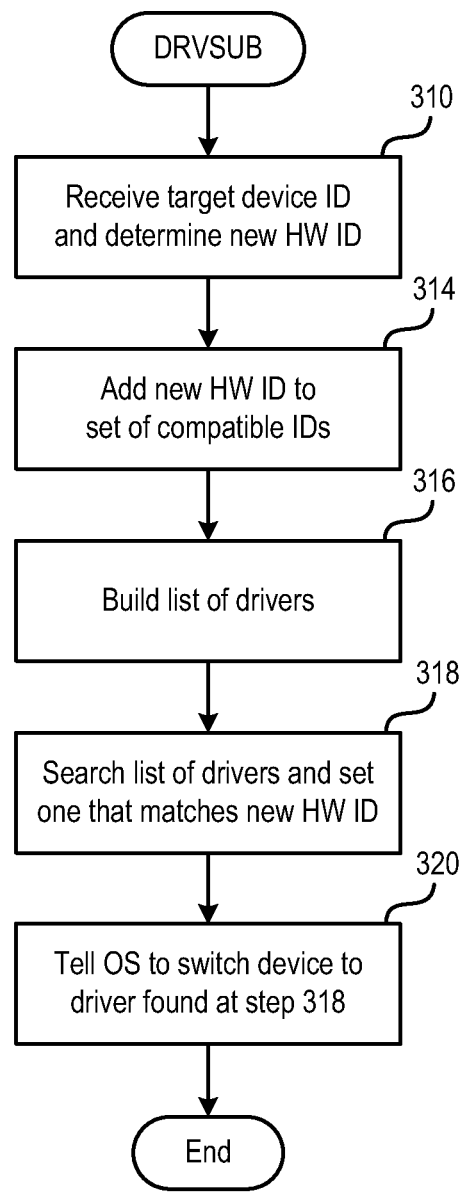
FIG. 3 is a flow diagram that illustrates a method of substituting a driver according an embodiment of the present invention.

FIG. 3 is a flow diagram that illustrates a method of substituting a driver according an embodiment of the present invention. In the embodiment of the present invention described herein, the method is executed in either computer system 100 or virtualized computer system 200 and by any one of DRVSUB 105, 205, 217, referred to simply as DRVSUB in the descriptions provided below. In one embodiment, DRVSUB is launched when the user selects through a graphical user interface (GUI) provided by App 101, desktop remoting client 201 or VM 203, one or more devices for which driver substitution is desired. Each of these devices is identified using a unique instance ID that was given by the OS as described above. It should be recognized that, for USB composite devices, the sub-components can be independently selected because each of the sub-components has its own unique instance ID. The choice of the new driver may also be selected by the user or, in some cases, the new driver may be programmatically selected by App 101, desktop remoting client 201 or VM 203 based on the GUI context. For example, if the GUI displayed by VM 203 prompts the user to select a USB device that the user wishes to control from for VM 203, the new driver is programmatically selected as the pass-through USB driver. The method below is described with names of API function calls as they exist in Microsoft Windows operating systems; however, it is contemplated that similar function calls can be used in an analogous manner in other operating systems. In addition, it is contemplated that other API function calls as they exist in Microsoft Windows operating systems may be used to accomplish the same result.

The method begins at step 310 where DRVSUB receives an instance ID of a device that has been targeted for driver substitution and determines a hardware ID associated with the new driver. The hardware ID associated with the new driver may be determined using a pre-existing data structure that maps the hardware ID to the new driver or extracted during run-time from the information file of the new driver. The pre-existing data structure may have been generated when DRVSUB is compiled based on mappings hard-coded into DRVSUB. At step 314, an API call is made to the underlying OS (e.g., OS 110 or OS 210) to add the new hardware ID to a set of compatible IDs for the targeted device. The API function CM_Add_Id( ) is used in this step. At step 316, a list of drivers is constructed through the API function SetupDiBuildDriverInfoList( ). The execution of this API function causes the OS to scan information files of all drivers and add to the list those drivers that have the hardware ID of the targeted device or any of the compatible IDs identified in the information files. In some embodiments, a cache is prepared to store this information to make look-ups easier. Once this list has been compiled, DRVSUB conducts a search of this list at step 318 for the driver corresponding to the new hardware ID that was added at step 314, or any other driver attribute, such as the driver name, description, manufacturer, or provider, assuming such information was also added at step 314 or derived from the new hardware ID added at step 314. The search is performed by examining the information file of each driver in the list using the API function SetupDiGetDriverInfoDetail( ) and looking for the ones that include the hardware ID of the new driver in their information files. When such driver is found, the API function SetupDiSetSelectedDriver( ) is used to set that driver as the driver for the targeted device. In alternative embodiments, if there is more than one such driver, the OS ranks the drivers according to known methods and selects the highest ranked driver. Alternatively, the user may be prompted to select one of the drivers. In all cases, the driver selected by the OS or by the user is set as the driver for the targeted device using the API function SetupDiSetSelectedDriver( ). Then, at step 320, the OS is asked to switch the driver of the targeted device to the new driver using the API calls SetupDiSetSelectedDevice( ) and InstallSelectedDriver( )

In an alternative embodiment, the set of hardware IDs or the set of compatible IDs may be retrieved using the API function SetupDiGetDeviceRegistryProperty( ), modified to include the new hardware ID in either the set of hardware IDs or the set of compatible IDs, and then updated using the API function SetupDiSetDeviceRegistryProperty( ). By adding the new hardware ID to the front of the set of hardware IDs, the driver for the new hardware ID would become the best match for the device. Thus, rather than explicitly picking the driver, the DRVSUB code would only need to ask the OS to pick the best driver for the device and the OS would pick the desired driver automatically.

In addition, when undoing the change in drivers, the hardware ID that was added in step 314 is removed if still present. Then, the API function, SetupDiCallClassInstaller( ) is called with the driver selection parameter of the API function set as DIF_SELECTBESTCOMPATDRV to have the OS pick out what it thinks is the best driver. Another approach for undoing the change in drivers is to record which driver was used before the switch and then switch back to that same driver.

FIG. 4 is sample code for carrying out steps 314, 316, 318, and 320 of the method of FIG. 3. The correspondence between the portions of the sample code to the method steps shown in FIG. 3 is shown in FIG. 4.

Figure 5:
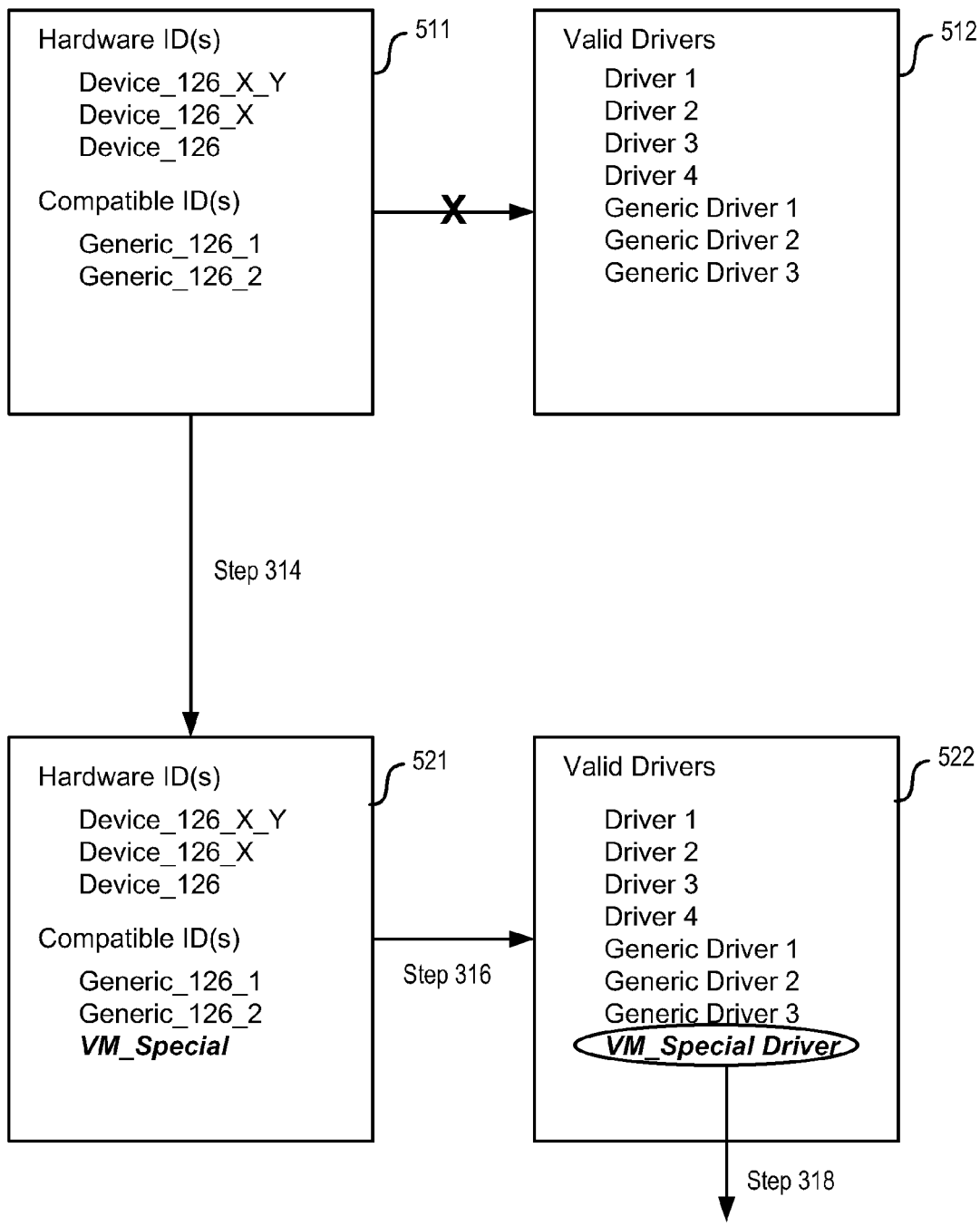
FIG. 5 is a diagram that illustrates conceptually some of the steps being carried out in the method of FIG. 3.

FIG. 5 is a diagram that illustrates conceptually some of the steps being carried out in the method of FIG. 3. Box 511 represents the hardware IDs and compatible IDs for the targeted device after the OS has queried the attached devices for their hardware IDs. The set includes different versions of hardware IDs as well as generic hardware IDs that are compatible with the targeted device. From this set and the information files of drivers that are available to the OS, a list of valid drivers is constructed. Box 512 is a conceptual illustration of this list. When step 314 of the method of FIG. 3 is carried out, the set represented in box 511 is modified to have an additional entry. The resulting set is shown in box 521 and the additional entry is shown as "VM_Special." When step 316 is carried out, the set represented in box 521 is used instead of the set represented in box 511. As a consequence, the resulting list of valid drivers has an additional entry. Box 522 is a conceptual illustration of this list and the additional entry is shown as "VM_Special Driver." When step 318 of the method of FIG. 3 is carried out, VM_Special Driver is set as the driver because it is the only driver that has the new hardware ID, VM_Special, identified in its information file.

Figure 6:
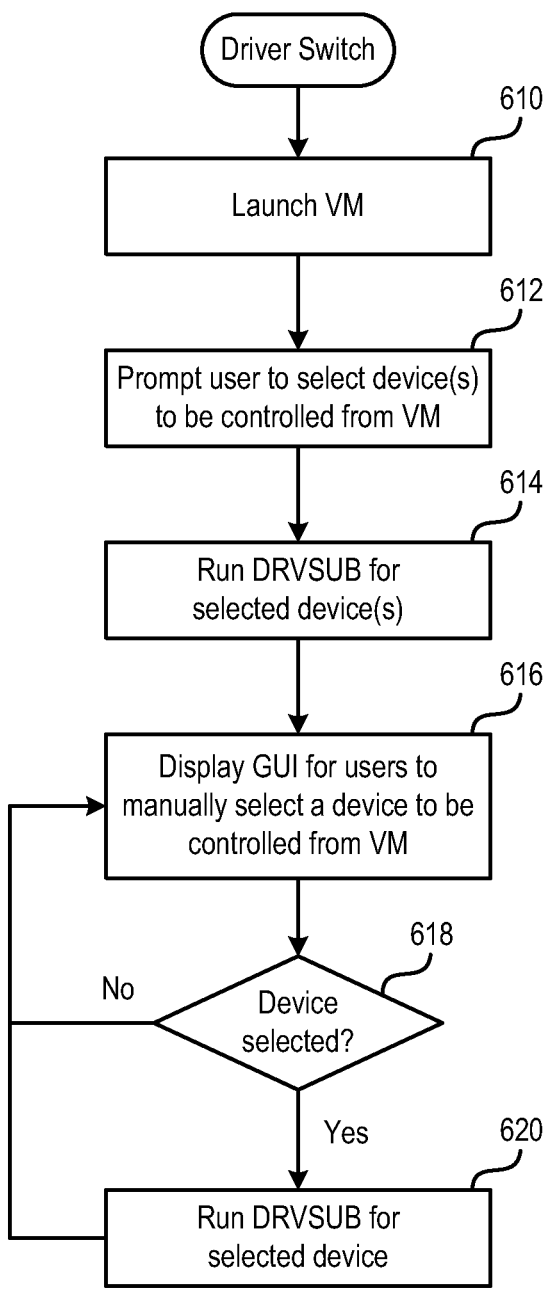
FIG. 6 is a flow diagram of a process running in a virtual machine monitor for initiating a driver substitution method of FIG. 3.

FIG. 6 is a flow diagram of a process running in a virtual machine monitor for initiating a driver substitution method of FIG. 3. In the embodiment of the present invention described herein, the method is executed in virtualized computer system 200 and by VMM 216. At step 610, a virtual machine is launched. Then, at step 612, the user is prompted to select one or more devices that the user wants to control from the VM. The DRVSUB code is executed for such devices at step 614. While the VM is running, the user may specify additional devices to be controlled from the VM through a GUI. This GUI is displayed at step 616. Upon a selection event as detected at step 618, the DRVSUB code is executed for the selected device at step 620.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of substituting a current driver for a target device with a new driver for the target device using an application-level code running in a computer system concurrently with an operating system that manages drivers for a plurality of devices including the target device, comprising:
generating a set of hardware identifiers for the target device;
updating the set of hardware identifiers for the target device to add a new hardware identifier that is not in the set;
building a list of drivers based on the updated set of hardware identifiers that includes the new hardware identifier; and
calling into the operating system to cause the operating system to switch the driver for the target device to a new driver which is selected from the list.

2. The method of claim 1, further comprising:
selecting a driver in the list that has a property that matches the new hardware identifier to be the new driver.

3. The method of claim 2, further comprising:
querying the operating system for properties of the drivers.

4. The method of claim 3, wherein said building includes:
adding to the list of drivers the drivers having at least one property that matches one of the hardware identifiers in the list.

5. The method of claim 4, wherein said adding, said building, and said selecting comprise API calls into the operating system.

6. The method of claim 1, wherein the computer system has a virtual machine running therein and the new driver is a driver configured to support the use of the target device by the virtual machine.

7. The method of claim 1, wherein the target device is one of at least two secondary USB devices of a primary USB device.

8. The method of claim 1, wherein the target device is one of a PCI device, a PCI-X device, and a PCI Express device.

9. A method of substituting one of multiple drivers for a target device with a new driver using an application programming interface (API) calls into an operating system that manages drivers for a plurality of devices including the target device, comprising:
- generating a set of hardware identifiers for a sub-component of the target device;
- updating the set of hardware identifiers for the sub-component of the target device that is controlled by one of multiple drivers for the target device to add a new hardware identifier that is not in the set;
- building a list of drivers based on the updated set of hardware identifiers that includes the new hardware identifier;
- selecting, as the new driver to replace one of multiple drivers for the target device, a driver from the list having a property that matches the new hardware identifier; and
- calling into the operating system to cause the operating system to switch the driver for the sub-component of the target device to the selected driver.

10. The method of claim 9, wherein the target device has first and second hardware functions, and the new driver controls access to the first hardware function of the target device, and the other driver controls access to the second hardware function of the target device.

11. The method of claim 10, wherein, when the new driver is selected to replace said one of at least two drivers for the target device, the other driver is not changed.

12. The method of claim 9, wherein said building includes:
- adding to the list of drivers the drivers having at least one property that matches one of the hardware identifiers in the list.

13. The method of claim 9, wherein the new driver is a driver configured to support the use of the target device by a virtual machine.

14. A non-transitory computer-readable storage medium comprising application-level instructions to be executed concurrently with an operating system of a computer system, wherein the instructions when executed, cause the computer system to substitute a current driver for a target device with a new driver for the target device by carrying out the steps of:
- generating a set of hardware identifiers for the target device;
- updating the set of hardware identifiers for the target device to add a new hardware identifier that is not in the set;
- building a list of drivers based on the updated set of hardware identifiers that includes the new hardware identifier; and
- calling into the operating system to cause the operating system to switch the driver for the target device to a new driver which is selected from the list.

15. The non-transitory computer-readable storage medium of claim 14, wherein the application-level instructions when executed, cause the computer system to further carry out the step of:
- selecting a driver in the list that has a property that matches the new hardware identifier to be the new driver.

16. The non-transitory computer-readable storage medium of claim 15, further comprising information files of the drivers in the list.

17. The non-transitory computer-readable storage medium of claim 16, wherein the application-level instructions when executed, cause the computer system to further carry out the step of:
- querying the operating system for properties of the drivers.

18. The non-transitory computer-readable storage medium of claim 17, wherein said building includes:
- adding to the list of drivers the drivers having at least one property that matches one of the hardware identifiers in the list.

19. The non-transitory computer-readable storage medium of claim 14, wherein the steps of adding, building, and selecting are carried out with API calls into the operating system.

20. The non-transitory computer-readable storage medium of claim 14, further comprising instructions for instantiating a virtual machine in the computer system, wherein the new driver is a driver configured to support the use of the target device by a virtual machine.

* * * * *